UNITED STATES PATENT OFFICE.

JOHN J. SCHILLINGER, OF NEW YORK, N. Y.

IMPROVEMENT IN CONCRETE BLOCKS FOR PAVING.

Specification forming part of Letters Patent No. 111,480, dated January 31, 1871.

*To all whom it may concern:*

Be it known that I, JOHN J. SCHILLINGER, of the city, county, and State of New York, have invented a new and Improved Compound for Pavement-Blocks; and I do hereby declare the following to be a full, clear, and exact description thereof, which will enable those skilled in the art to make and use the same.

This invention relates to a compound for pavement-blocks made of cement and broken stone mixed together and formed into blocks of suitable form, leaving the broken stones exposed on the upper surfaces of the blocks in such a manner that, by the broken stones, an additional firmness is given to the blocks, and, at the same time, the surface of the blocks is prevented from abrasion, and rendered sufficiently rough to offer a foothold to the feet of horses or other draft-animals.

In carrying out my invention I take cement and mix the same with a sufficient quantity of sand and water to produce a plastic mass. I then prepare molds of suitable shape or form, and in the bottom of these molds I place a layer of broken stones, by preference small pieces of granite or other hard material, and this layer I cover with the plastic mass of cement until the molds are filled. By these means the broken stones are firmly embedded in the cement, and, after the cement has set, the molds are taken off and the blocks are left to harden.

In laying these blocks the surfaces containing the broken stones are turned up, and the blocks are embedded in a layer of cement spread on the street to be paved, suitable interstices being left between the adjoining blocks, which interstices are afterward filled with cement.

The blocks must be put down on the cement-bed before said bed has become hard, and after the interstices between the adjoining blocks have been filled with cement the whole mass is firmly bound together.

By mixing the cement-blocks with broken stones, as above stated, the surfaces of said blocks are rendered more durable than they would be if the blocks were made of pure cement; and, furthermore, the cement close to or between the edges of the broken stones will soon wear out, and the surface of the blocks is rendered sufficiently rough to prevent horses or other draft-animals from slipping.

What I claim as new, and desire to secure by Letters Patent, is—

A compound for pavement-blocks made of cement and broken stones mixed together and formed into blocks of suitable form, leaving the broken stones exposed on the upper surfaces of the blocks, substantially in the manner herein described.

JOHN J. SCHILLINGER.

Witnesses:
  W. HAUFF,
  E. F. KASTENHUBER.